United States Patent
Zaier

(10) Patent No.: US 7,482,775 B2
(45) Date of Patent: Jan. 27, 2009

(54) ROBOT CONTROLLER

(75) Inventor: Riadh Zaier, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/375,140

(22) Filed: Mar. 15, 2006

(65) Prior Publication Data

US 2007/0145930 A1  Jun. 28, 2007

(30) Foreign Application Priority Data

Dec. 27, 2005 (JP) ............................. 2005-376459

(51) Int. Cl.
*B25J 13/08* (2006.01)
*G06F 19/00* (2006.01)

(52) U.S. Cl. .......................... 318/568.12; 318/568.22; 700/245

(58) Field of Classification Search .... 318/567–568.25, 318/632; 901/1, 46; 700/245, 254
See application file for complete search history.

(56) References Cited

U.S. PATENT DOCUMENTS

| | | | |
|---|---|---|---|
| 5,343,397 A * | 8/1994 | Yoshino et al. ............... | 701/23 |
| 5,838,130 A * | 11/1998 | Ozawa .................... | 318/568.2 |
| 6,064,167 A * | 5/2000 | Takenaka et al. ....... | 318/568.12 |
| 6,243,623 B1 * | 6/2001 | Takenaka et al. ............ | 700/245 |
| 6,289,265 B1 | 9/2001 | Takenaka et al. | |
| 6,505,096 B2 * | 1/2003 | Takenaka et al. ............ | 700/245 |
| 6,556,892 B2 | 4/2003 | Kuroki et al. | |
| 6,697,711 B2 | 2/2004 | Yokono et al. | |
| 6,754,560 B2 | 6/2004 | Fujita et al. | |
| 6,802,382 B2 | 10/2004 | Hattori et al. | |
| 6,876,903 B2 | 4/2005 | Takenaka | |
| 6,992,456 B2 * | 1/2006 | Furuta et al. ........... | 318/568.12 |
| 7,024,276 B2 * | 4/2006 | Ito ............................. | 700/245 |
| 7,072,741 B2 * | 7/2006 | Nagashima ................. | 700/245 |
| 2005/0119791 A1 * | 6/2005 | Nagashima ................. | 700/253 |

FOREIGN PATENT DOCUMENTS

JP 2005-96068 4/2005

\* cited by examiner

*Primary Examiner*—Bentsu Ro
(74) *Attorney, Agent, or Firm*—Westerman, Hattori, Daniels & Adrian, LLP.

(57) ABSTRACT

Motions of a robot are defined by a plurality of frames P0 to P11 at a plurality of different time points. The frames include a plurality of reference frames. In the reference frames, the robot stands alone without falling. The data of the other frames, i.e., frames other than the reference frames, are set only roughly before the robot begins walking. When the robot starts walking, the roughly set data of the other frames is corrected based on control information calculated from the roughly set data and the data of the reference frames.

12 Claims, 13 Drawing Sheets

FIG.12
FRAME P0
$$\delta_y = \frac{(F_3 + F_4)}{\sum F_i} - 0.5 \approx 0.21$$
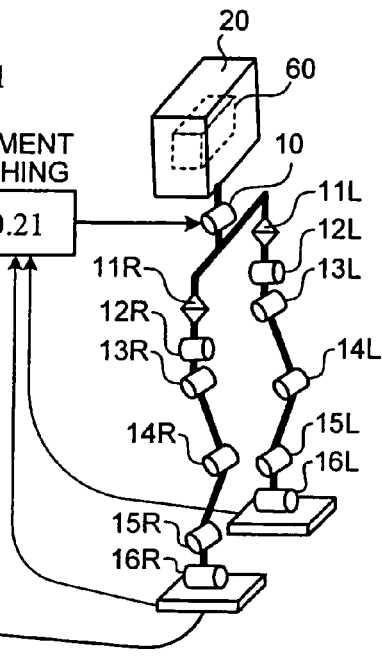
ADJUSTMENT OF PITCHING
$\delta_y \approx 0.21$
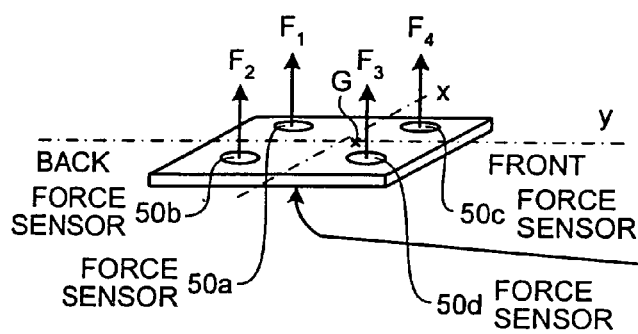
FRAME P1
$$\delta_y = \frac{(F_2 + F_3)}{\sum F_i} - 0.5 \approx 0.40$$
ADJUSTMENT OF GEAR BACKLASH
$$\int_{t1}^{t2} (Jyro_y - Jyro_h)^2 dt$$
ADJUSTMENT OF ROLLING
$\delta_x \approx 0.40$
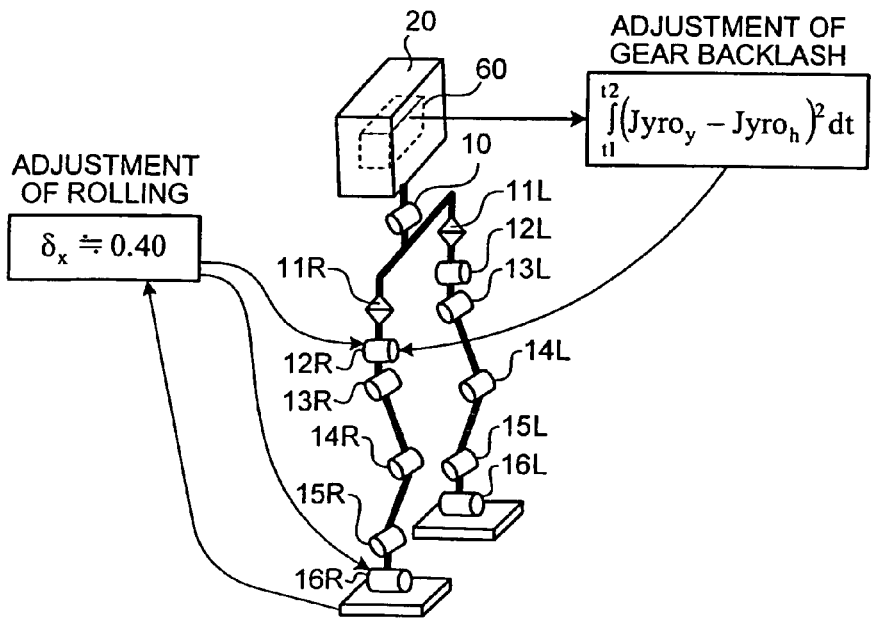

FIG.15
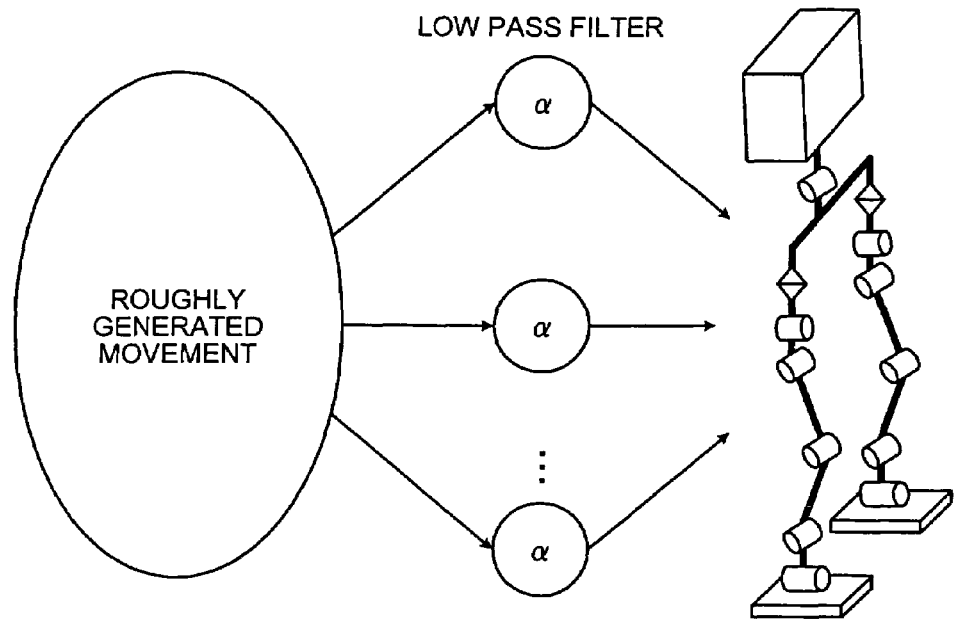
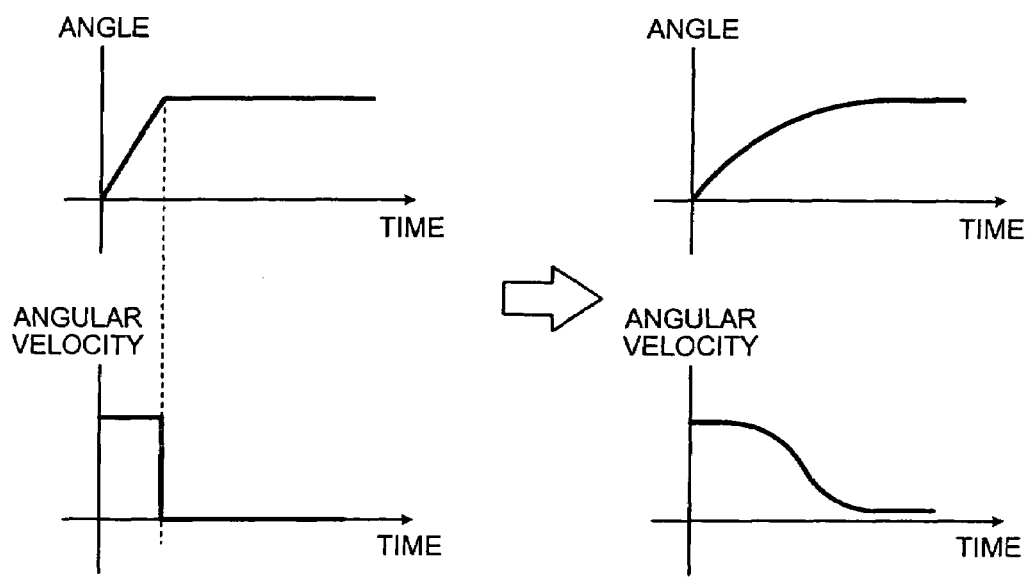

FIG.16
WALKING ON FLAT FLOOR SURFACE
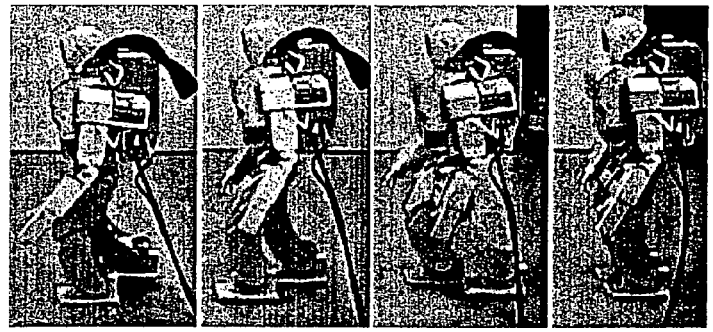
WALKING ON INCLINED FLOOR SURFACE
WALKING ON STEPS
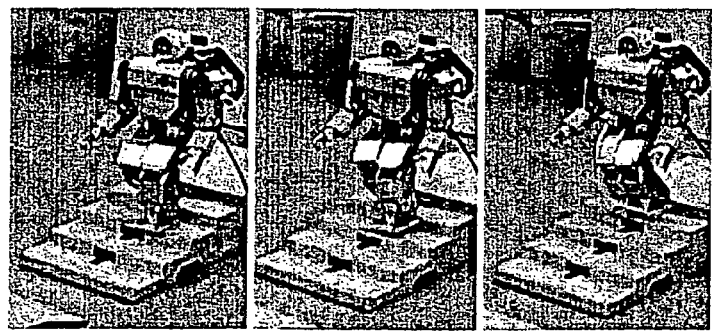

ROBOT CONTROLLER

BACKGROUND OF THE INVENTION

1. Field of the Invention

The present invention relates to a robot controller for controlling motions of a robot.

2. Description of the Related Art

Recently, humanoid robots, particularly walking of humanoid robots, are attracting attentions of the researchers. Most of the studies relating to walking of the humanoid robots use the ZMP (Zero Moment Point) criteria. The ZMP criteria include a control to retain the ZMP within a support polygon. Specifically, this approach includes modeling the humanoid robot and the environment around the robot, and solving a differential equation. However, accurate modeling becomes difficult if there are unknowns. Furthermore, a real time control becomes difficult because time is taken in solving the differential equation.

One approach is to use a method that does not employ the ZMP criteria at all. There have been known techniques, for example, that make use of a cyclic movement of a movable section of a robot, and adjust a phase of the cyclic movement so as to stabilize posture of the robot (See Japanese Patent Laid-Open Publication No. 2005-96068). The movable section can be a leg or an arm of a robot.

However, humanoid robots can performs different types of movements one after another. In this case, the cycle of the movable section varies depending on the type of movement performed by the robot. In other words, the movable section does not perform a cyclic movement when the humanoid robot performs different types of movements one after another. Because the movable section does not necessarily perform a cyclic movement, it becomes difficult in the conventional technique to control a posture of the robot.

There is a need to develop a technique enabling efficient control for stabilizing various motions of a humanoid robot without modeling the humanoid robot and the environment around the robot.

SUMMARY OF THE INVENTION

It is an object of the present invention to at least solve the problems in the conventional technology.

According to an aspect of the present invention, a robot controller that controls motions of a robot, includes a posture information acquiring unit that acquires posture information indicative of a posture of the robot at each of a plurality of different time points, the postures including at least one reference posture in which the robot stands alone without falling down; and a motion controlling unit that controls motions of the robot in between any two of the postures by calculating control information based on the posture information of at least the two postures such that the motion of the robot reaches the reference posture.

According to another aspect of the present invention, a method of controlling motions of a robot, includes a posture information acquiring step of acquiring posture information indicative of a posture of the robot at each of a plurality of different time points, the postures including at least one reference posture in which the robot stands alone without falling down; and a motion controlling step of controlling motions of the robot in between any two of the postures by calculating control information based on the posture information of at least the two postures such that the motion of the robot reaches the reference posture.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 12 is a view illustrating a processing of adjusting a control parameter using a performance function;

FIG. 15 is a view illustrating an action of a neuron having a prespecified time delay constant; and FIG. 16 includes photographs of the robot 110 stably walking on a floor surface.

DETAILED DESCRIPTION OF THE PREFERRED EMBODIMENTS

Exemplary embodiments of the present invention are described in detail below with reference to the accompanying drawings. A two-legged humanoid robot is described below as an example; however, the present invention can be applied to other robot, such as a four-legged robot.

Figure 1:
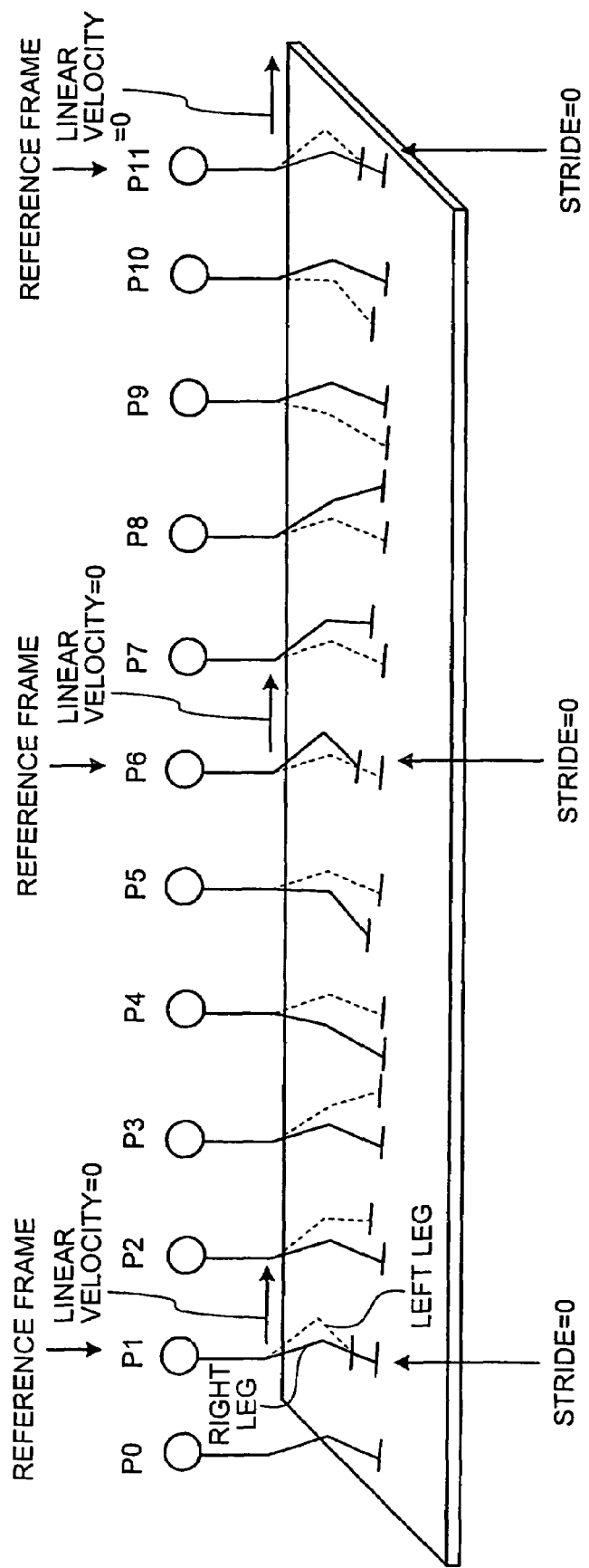
FIG. 1 is a schematic for explaining a concept of the present invention.

FIG. 1 is a schematic for explaining a concept of the present invention. A right leg of a robot is shown with a solid line and a left leg is shown with a dotted line. A plurality of frames P1 is previously set that define various postures during walking movement of the robot. Precisely, the frames define the parameters such as the angles of the joints of the robot.

In the example of FIG. 1, twelve frames P0 to P11 are set; however, the number of frames in optional. The frame P0 corresponds to a posture in which the robot is stands alone without falling before starting of walking. The frames P1, P6, and P11 correspond to postures in which the robot does not make any movement, however, stands alone without falling.

For example, in frame P6, the linear speed of the robot is zero, the robot is standing only on the left leg, and the stride is zero. The state of the robot in both the frames P1 and P11 is the same. In other words, in frames P1 and P11, the linear speed is zero, the robot is standing only on the right leg, and the stride is zero. Zero-stride means that both the legs of the robot are aligned. In the frames P1, P6, and P11 the robot is standing alone and the stride is zero; therefore, these frames will be referred to as reference frames.

Switching from one frame to another frame is performed by interpolating postures of the all the intervening frames. The frames other than the reference frames are only roughly defined, and the frames are corrected from time to time so that the robot can walk stably.

Figure 2:
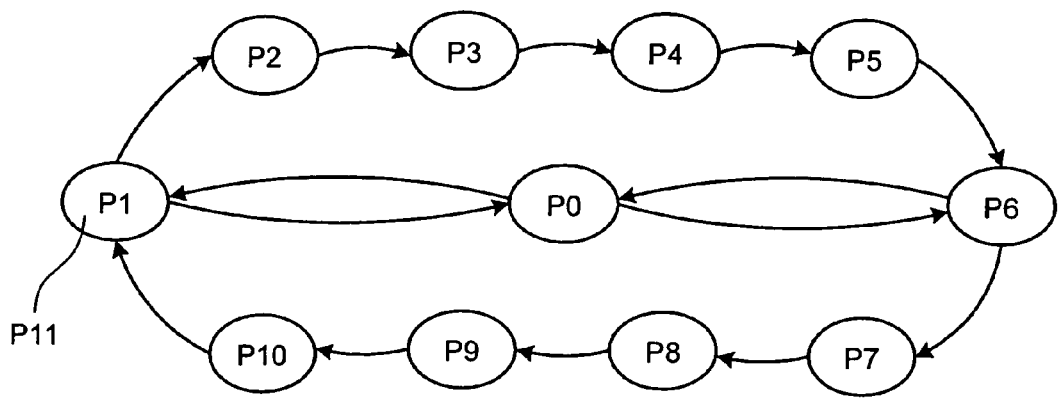
FIG. 2 is a state transition graph of frames P1 to P11 shown in FIG. 1.

FIG. 2 is a state transition graph of the frames P1 to P1. The state of the robot can shift from the frame P0 to the reference frame P1 (which is the same as reference frame P11) or to the reference frame P6. The state of the robot can even shift from the reference frame P1 or the reference frame P6 to the frame P0. In the example shown in FIG. 1, the state of the robot shifts from the frame P0 to the reference frame P1, and then to the reference frame P11, via the frames P2 to P10.

Thus, the state of the robot is controlled by acquiring frame information including the reference frames P1, P6, and P11 in which the robot stands alone without falling down, and interpolating postures in between the frames P0 to P11 such that the motion of the robot reaches the posture of the reference frames P1, P6, and P11. Therefore, even if the posture of the robot becomes instable in the in between frames, the posture becomes stable any way in the reference frames. In other words, the robot can continue to walk in stably.

In reference frames P6 and P11, the robot suspends walking and stands stably, so that it is easy at these frames to change a stride for subsequent walking or a direction in which the robot walks, or to start movement other than walking.

Figure 3:
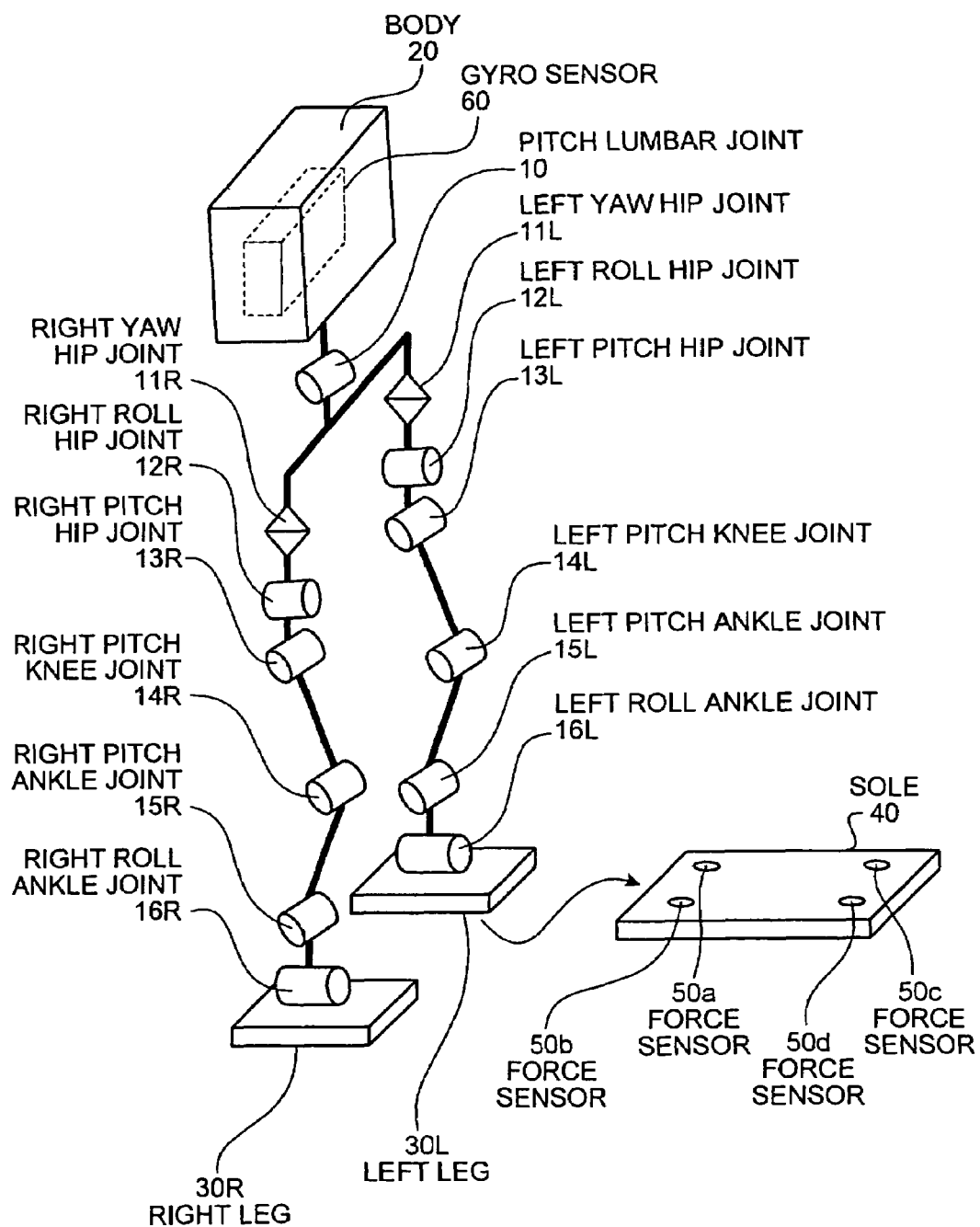
FIG. 3 is a schematic of a robot.

FIG. 3 is a schematic of a robot. The robot includes a body 20, a gyro sensor 60 arranged in the body, and two legs, a right leg 30R and a left leg 30L. Each leg has six joints. Thus, the degree of freedom of each leg is six. However, the number of joints is optional.

The joints include a pitch lumbar joint 10, a right yaw hip joint 11R, a left yaw hip joint 11L, a right roll hip joint 12R, a left roll hip joint 12L, a right pitch hip joint 13R, a left pitch hip joint 13L, a right pitch knee joint 14R, a left pitch knee joint 14L, a right pitch ankle joint 15R, a left pitch ankle joint 15L, a right roll ankle joint 16R, and a left roll ankle joint 16L. A motor (not shown) is incorporated in each joint. The motor of a particular joint controls movements of that joint.

The pitch lumbar joint 10 controls back and forth movements (pitching) of the body 20. Each of the right yaw hip joint 11R and the left yaw hip joint 11L causes clockwise or counterclockwise rotation (yawing) of the robot at upper ends of the corresponding leg.

Each of the right roll hip joint 12R and the left roll hip joint 12L causes sideward rotation (rolling) of the robot at upper ends of the corresponding leg. Each of the right pitch hip joint 13R and the left pitch hip joint 13L causes back and forth rotation (pitching) of the robot at upper ends of the corresponding leg.

Each of the right pitch knee joint 14R and the left pitch knee joint 14L causes back and forth movements (pitching) of the robot at a corresponding knee section. Each of the right pitch ankle joint 15R and the left pitch ankle joint 15L causes back and forth movements (pitching) of the robot at a corresponding ankle section. Each of the right roll ankle joint 16R and the left roll ankle joint 16L causes sideward movements (rolling) of the robot at a corresponding ankle section.

A sole is attached to each leg. FIG. 3 depicts a sole 40 attached to the left leg 30L. Four force sensors are incorporated in each sole. However, the number of the force sensors is optional. FIG. 3 depicts force sensors 50a to 50d attached to the sole 40. The force sensors measure a reaction force which the sole receives from floor surface.

The gyro sensor 60 measures rotational angles of the body 20 in the sideward (rolling) direction and in the back and forth (pitching) direction. The reaction force measured by the force sensors of both legs and the rotational angles measured by the gyro sensor 60 are used to perform feedback control of movements of the robot.

Figure 4:
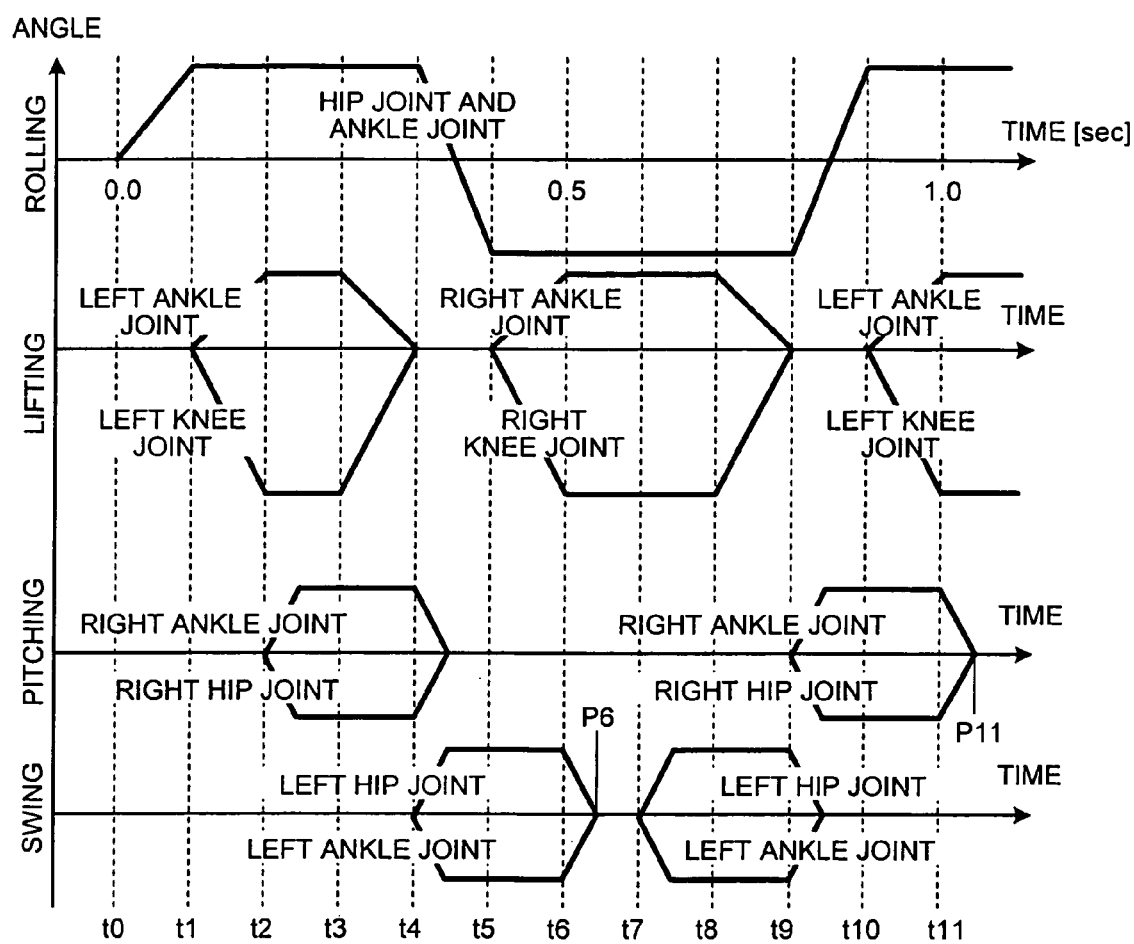
FIG. 4 is a time chart for explaining walking motion of the robot shown in FIG. 3.

FIG. 4 is a time chart for explaining walking motion of the robot. At a time point t0, the right roll hip joint 12R, the left roll hip joint 12L, the right roll ankle joint 16R, and the left roll ankle joint 16L carry out rolling movement whereby the two legs incline to the right side of the robot to allow raising of the left leg. When performing this movement, the movements of the right roll hip joint 12R, the left roll hip joint 12L, the right roll ankle joint 16R, and the left roll ankle joint 16L differ slightly to compensate for the gear backlash compensation.

The amplitude of the rolling movement can be decided through trial-and-error. The amplitude of the rolling movement can also be decided by performing feedback control in such a manner that the performance function of the rolling angle of the body 20 is minimized.

At a time point t1, the right roll hip joint 12R, the left roll hip joint 12L, the right roll ankle joint 16R, and the left roll ankle joint 16L suspend rolling movement. Moreover, to raise the left leg, i.e., to perform a lifting operation with respect to the left leg, the left pitch knee joint 14L rotates so that the left leg is drawn, and the left pitch ankle joint 15L rotates so that the left ankle is drawn.

At a time point t2, the left pitch knee joint 14L and the left pitch ankle joint 15L suspend lifting movement. Moreover, the right pitch hip joint 13R and the right pitch ankle joint 15R rotate to perform pitching movement so that the body 20 moves forward.

Between the time point t2 and a time point t3, the right pitch hip joint 13R and the right pitch ankle joint 15R suspend a pitching movement.

At the time point t3, to land the left leg on the floor surface, the left pitch knee joint 14L rotates to extend the left leg, and the left pitch ankle joint 15L rotates to extend the left ankle.

At a time point t4, the left leg lands on the floor surface. In addition, the right roll hip joint 12R, the left roll hip joint 12L, the right roll ankle joint 16R, and the left roll ankle joint 16L perform rolling movements whereby the two legs incline to the left side of the robot to allow raising of the right leg. Moreover, the right pitch hip joint 13R and the right pitch ankle joint 15R rotate so as to return to their original states, i.e., their states at the time point t2. Furthermore, to swing the right leg forward, the left pitch hip joint 13L and the left pitch ankle joint 15L rotate to perform pitching movement so that the body 20 moves forward.

Between the time point t4 and a time point t5, the right pitch hip joint 13R and the right pitch ankle joint 15R return to their original states, and the left pitch hip joint 13L and the left pitch ankle joint 15L suspend pitching motions.

At the time point t5, the right roll hip joint 12R, the left roll hip joint 12L, the right roll ankle joint 16R, and the left roll ankle joint 16L suspend rolling movement. Moreover, to raise the right leg, i.e., to perform a lifting operation with respect to the right leg, the right pitch knee joint 14R rotates so that the right leg is drawn, and the right pitch ankle joint 15R rotates so that the right ankle is drawn.

At a time point t6, the right pitch knee joint 14R and the right pitch ankle joint 15R suspend lifting movements. Moreover, the left pitch hip joint 13L and the left pitch ankle joint 15L rotate so as to return to their original states, i.e., their states at the time point t4. As a result, the robot is set in the posture defined by the reference frame P6.

Between the time point t6 and a time point t7, the left pitch hip joint 13L and the left pitch ankle joint 15L return to their original states. As a result, the robot is set in the posture defined by the reference frame P6. Namely, the linear velocity of the robot becomes zero, the robot stands only on the left leg, and the stride is zero.

At the time point t7, to swing the right leg forward, the left pitch hip joint 13L and the left pitch ankle joint 15L rotate to perform pitching movement so that the body 20 moves forward.

Between the time point t7 and a time point t8, the left pitch hip joint 13L and the left pitch ankle joint 15L suspend pitching movements. At the time point t8, to land the right leg on the floor surface, the right pitch knee joint 14R rotates to extend the right leg, and the right pitch ankle joint 15R rotate to extend the right ankle.

At a time point t9, the right leg lands on the floor surface. In addition, the right roll hip joint 12R, the left roll hip joint 12L, the right roll ankle joint 16R, and the left roll ankle joint 16L perform rolling movements whereby the two legs incline to the right side of the robot to allow raising of the left leg. Moreover, to swing the left leg forward, the right pitch hip joint 13R and the right pitch ankle joint 15R rotate to perform pitching movements so that the body 20 moves forward. Furthermore, the left pitch hip joint 13L and the left pitch ankle joint 15L rotate so as to return to their original states, i.e., their states at the time point t7.

At a time point t10, the right roll hip joint 12R, the left roll hip joint 12L, the right roll ankle joint 16R, and the left roll ankle joint 16L suspend rolling movements. Moreover, to raise the left leg, i.e., to perform a lifting operation with respect to the left leg, the left pitch knee joint 14L rotates so that the left leg is drawn, and the left pitch ankle joint 15L rotates so that the left ankle is drawn.

At a time point t11, the left pitch knee joint 14L and the left pitch ankle joint 15L suspend lifting movements. Moreover, the right pitch hip joint 13R and the right pitch ankle joint 15R rotate so as to return to their original states, i.e., their state at the time point t9. As a result, the robot is set in the posture defined by the reference frame P11.

At the time point t11 and on, the right pitch hip joint 13R and the right pitch ankle joint 15R return to their original states. As a result, the robot is set in the posture defined by the reference frame P11. Namely, the linear velocity of the robot becomes zero, the robot stands only on the right leg, and the stride is zero. Walking of the robot is realized by repeating the movements shown above.

Figure 5:
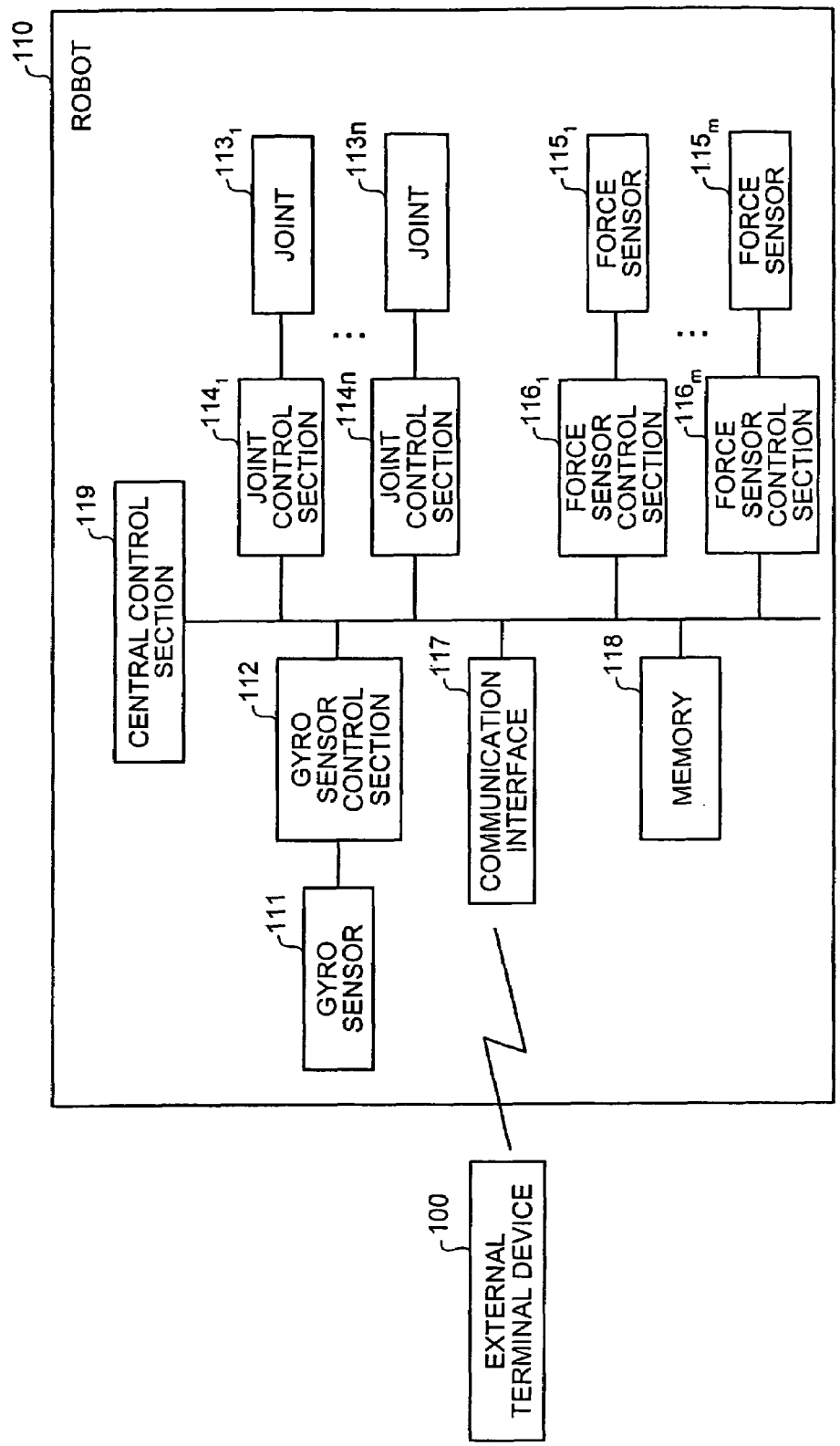
FIG. 5 is a functional block diagram of a robot control system according to an embodiment of the present invention.

FIG. 5 is a functional block diagram of a robot control system according to an embodiment of the present invention. The robot control system includes an external terminal device 100 and a robot 110.

The external terminal device 100 is, for example, a personal computer that is operated by an operator who controls the movement of the robot. The external terminal device 100 and the robot 110 can communicate with each other. The communication includes transmission and reception of various types of information.

The external terminal device 100 transmits information concerning frames and/or command information to the robot 110, or receives information relating to states (posture, velocity, and the like) of the robot 110 from the robot 110. The information obtained from the robot 110 is displayed on a display device (not shown).

The robot 110 is, for example, a two-legged humanoid robot. The robot 110 includes a gyro sensor 111, a gyro sensor control section 112, joints $113_1$ to $113_n$ (where n is a natural number), joint control sections $114_1$ to $114_n$, force sensors $115_1$ to $115_m$ (where m is a natural number) force sensor control sections $116_1$ to $116_m$, a communication interface 117, a memory 118, and a central control section 119.

The gyro sensor 111 has the same functions as the gyro sensor 60 shown in FIG. 3. The gyro sensor 111 is provided inside the body 20 of the robot 110, and measures rotational angles in the sideward (rolling) direction and in the back and forth (pitching) direction of the body 20. The gyro sensor control section 112 controls functions of the gyro sensor 111 and transmits information indicative of the rotational angles measured by the gyro sensor 111 to the central control section 119.

The joints $113_1$ to $113_n$ move various joints of the robot 110. Motors (not shown) drive those joints. The joints include the pitch lumbar joint 10, the right yaw hip joint 11R, the left yaw hip joint 11L, the right roll hip joint 12R, the left roll hip joint 12L, the right pitch hip joint 13R, the left pitch hip joint 13L, the right pitch knee joint 14R, the left pitch knee joint 14L, the right pitch ankle joint 15R, the left pitch ankle joint 15L, the right roll ankle joint 16R, and the left roll ankle joint 16L explained in relation to FIG. 3.

The joint control sections $114_1$ to $114_n$ control motions of the joints $113_1$ to $113_n$. Specifically, the joint control sections $114_1$ to $114_n$ provide a control so that the joints $113_1$ to $113_n$ rotate to prespecified angles at prespecified angular velocities in prespecified times. The angles, the angular velocities, and the times are specified by the central control section 119.

The force sensors $115_1$ to $115_m$ are provided on soles of the right leg and the left legs of the robot 110. The force sensors $115_1$ to $115_m$ measure reaction forces from floor surface. The force sensors $115_1$ to $115_m$ perform the same functions as the force sensors 50a to 50d described in relation to FIG. 3. The force sensor control sections $116_1$ to $116_m$ control functions of the force sensors $115_1$ to $115_m$ and transmit information indicative of the reaction forces measured by the force sensors $115_1$ to $115_m$ to the central control section 119.

The communication interface 117 is used to perform communications with the external terminal device 100. The communication interface 117 can perform wireless and/or wired communications with the external terminal device 100.

The memory 118 stores therein various types of information. The memory 118 stores therein, for example, the information received from the external terminal device 100 and/or information to be sent to the external terminal device 100, and also stores therein information relating to results of various operations executed by the central control section 119.

The central control section 119 controls the robot 110 as a whole. The central control section 119, for example, calculates a time point for start of rotation, an angular velocity, a rotational angle and the like for each of the joints $113_1$ to $113_n$ when the robot 110 moves based on the frame information received from the external terminal device 100, and transmits the results to the joint control sections $114_1$ to $114_n$.

The central control section 119 also receives a request for controlling movement of the robot 110 from the external terminal device 100 via the communication interface 117. Such a request includes a request for changing stride and walking direction, or for executing movements other than walking.

The central control section 119 executes the request only after a posture corresponding to any one of the reference frames P1, P6, and P11 is realized. When executing the request, the central control section 119 transmits information indicative of time points for start of rotation, angular velocities, rotational angles and other parameters corresponding to the joints $113_1$ to $113_n$ for the requested movement to the joint control sections $114_1$ to $114_n$. Because the robot can stand stably on one leg in any of the reference frames P1, P6, and P11, it is convenient to execute the request when the robot 110 is in a posture corresponding to any one of the reference frames P1, P6, and P11.

Although it has been explained above that the central control section 119 calculates the various parameters, it is possible to employ a configuration in which the external terminal device 100 calculates the parameters and sends them to the robot 110. When such a configuration is adopted, the external terminal device 100 receives information required for computing a time point for start of rotation, an angular velocity, a rotational angle and other parameters from the robot 110 and calculates the parameters based on the received information. The joint control sections $114_1$ to $114_n$ receive the result of the computing from the external terminal device 100 and control motions of the robot 110 based on the received results.

The robot control processing performed by the central control section 119 is described in detail below. The robot control processing includes controlling transition of postures among the frames by using a basic recurrent neural network circuit. The basic recurrent neural network circuit used here indicates an RNN circuit for expressing transitions of postures among the frames.

Figure 6:
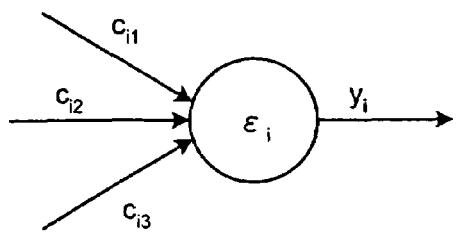
FIG. 6 is a schematic for explaining the mathematical expression model for a neuron.

At first, a model of a mathematical equation for a neuron is described below. FIG. 6 is a schematic for explaining the mathematical expression model for a neuron. The neuron model shown in FIG. 6 can be expressed with a first order differential equation (1):

$$\varepsilon_i \frac{d y_i}{dt} + y_i = \sum_j c_{ij} y_j \quad (1)$$

where $y_i$ is an output from an neuron i, $\epsilon_i$ is a time delay constant, and $y_j$ is an output from a neuron j inputted with a weighting coefficient $C_{ij}$. The time delay constant is equivalent to a time constant expressing a delay of response to a step input.

Figure 7:
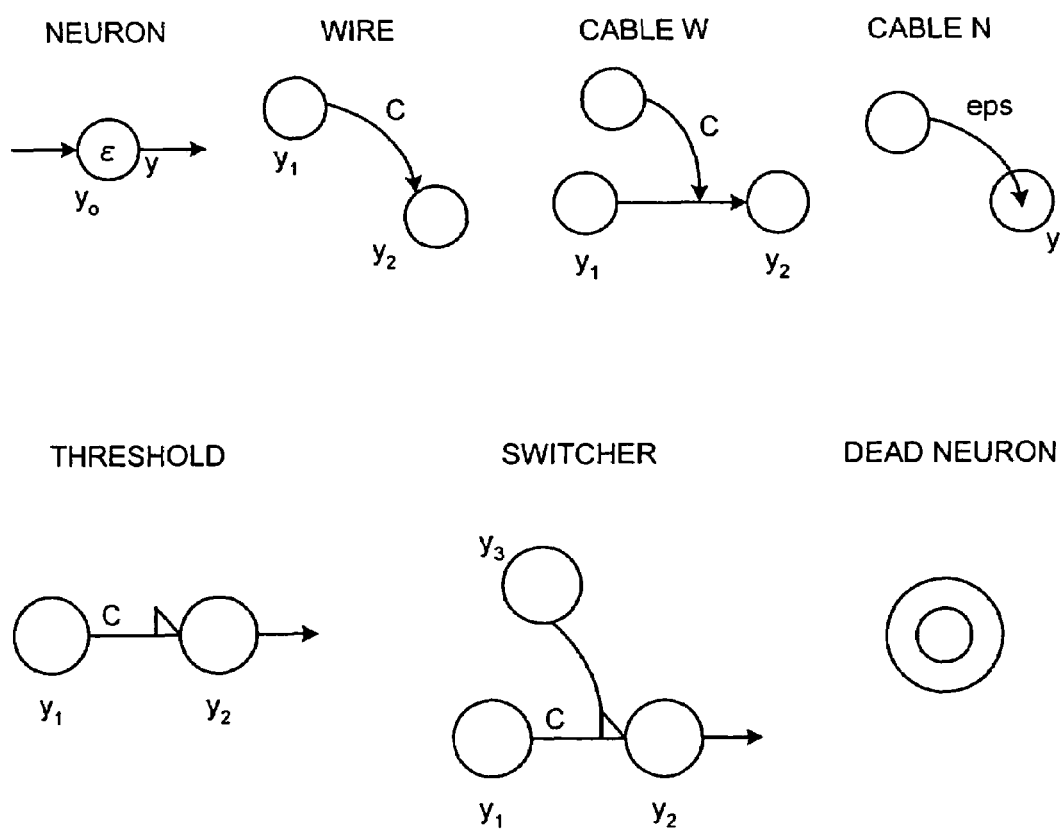
FIG. 7 is a schematic for explaining definitions of the components of the basic RNN circuit.

FIG. 7 is a schematic for explaining definitions of the components of the basic RNN circuit. The basic RNN circuit includes, as main components, a neuron, a wire, a cable W, a cable N, a threshold, a switcher, and a dead neuron.

A neuron with the time delay constant of $\epsilon$ and initial value of $y_0$ is defined as follows:

Neuron: $var\ y(\epsilon)=y_0$ where var is the definition of the cable W, the cable N, and the other components.

The wire is used for connecting two neurons with a prespecified weighting coefficient. For instance, connection between a neuron with the output of $y_1$ and a neuron with the output of $y_2$ is expressed as follows:

Wire: $y_2=C^*y_1$.

The cable W is used for changing a weighting coefficient of the wire. The cable W with the time delay constant of $\epsilon$ and initial value of $V_0$ is defined as follows:

Cable W: $var\ C(\epsilon)=V_0$.

Wire: $y_2=C^*y_1$.

The cable N is used for changing time delay constants for other neurons. The cable N with the time delay constant of $\epsilon$ and initial value of $V_0$ for changing a time delay constant of a neuron with the time delay constant of eps and initial value of $W_0$ is defined as follows:

Cable N: $var\ eps(\epsilon)=V_0$.

Neuron: $var\ y(eps)=W_0$.

The Threshold is used for receiving output $y_1$ from a certain neuron as an input value when output $y_1$ is larger or smaller than a prespecified value x. Namely, the threshold can be expressed as follows:

Threshold: $y_2:=C^*(x>)y_1$, or

Threshold: $y_2:=C^*(x<)y_1$.

For instance, when x=1,

Threshold: $y_2:=C^*(1>)y_1$, or

Threshold: $y_2:=C^*(1<)y_1$.

The switcher is used for receiving the value $y_1$ output from another neuron as an inputted value, when $y_3$ output from a certain neuron is larger or smaller than a prespecified value x. Namely, the switcher can be expressed as follows:

Switcher: $y_2:=if\ (y_3>x)C^*y_1$, or

Switcher: $y_2:=if\ (y_3<x)C^*y_1$.

For instance, when x=1,

Switcher: $y_2:=if\ (y_3>1)C^*y_1$, or

Switcher: $y_2:=if\ (y_3<1)C^*y_1$.

The threshold can be regarded as a kind of switcher. The dead neuron is a neuron having a time delay constant of 0.

Figure 8:
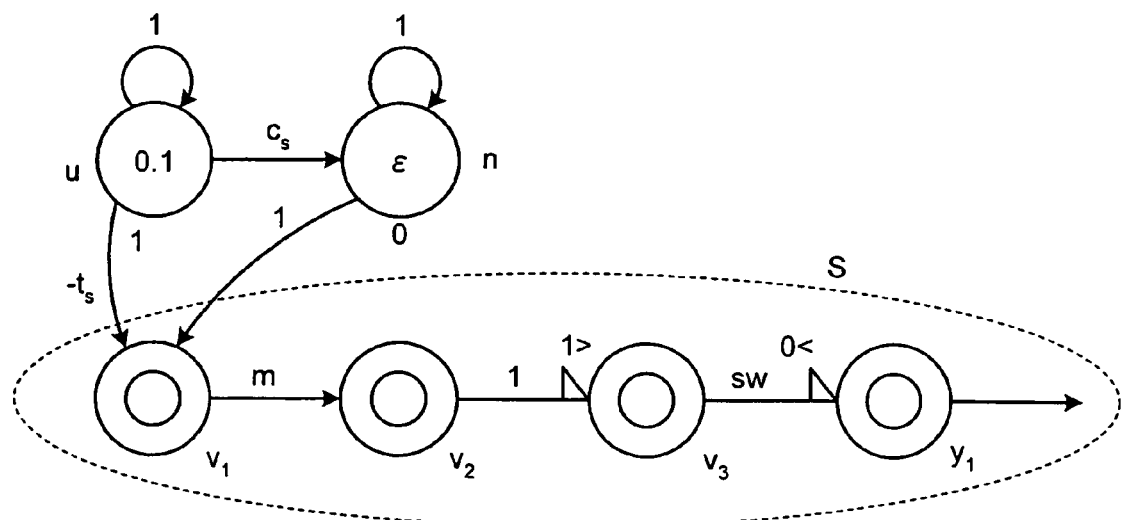
FIG. 8 is a schematic of the basic RNN circuit.

FIG. 8 is a schematic of the basic RNN circuit. The basic RNN circuit includes two neurons u and n, and a sub circuit S. The neuron u generates a unit constant. In the meantime, the neuron n generates a first order polynomial, when an output of the neuron u is inputted into the neuron n via a wire of the weighting coefficient $C_s$.

The time delay constant of any neuron belonging to the sub circuit S is null. Further, the parameter sw is used for switching on or off an operation generated by the basic RNN circuit.

Figure 9:
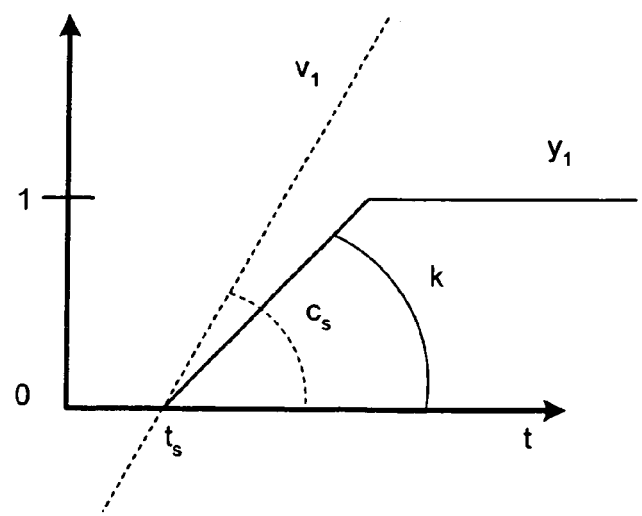
FIG. 9 is a schematic for explaining the output of the basic RNN circuit shown in FIG. 8.

FIG. 9 is a schematic for explaining the output of the basic RNN circuit shown in FIG. 8. FIG. 9 is a view illustrating a rotation at one degree starting at a prespecified angular velocity of $k=c_s m$ at time point $t_s$. In the present invention, though a plurality of frames are set, an operation shifting from a frame to the next frame is started at time point $t_s$.

Further, when the time delay constant $\epsilon$ is 1, the output $v_1$ can be expressed as follows:

$v1=c_s t-t_s$.

Shift in a posture between frames is determined by two parameters, namely, the start time point $t_s$ and an angular velocity k of a joint. Rotation of each joint is realized taking into consideration a basic movement and amplitude starting at the angular velocity k at the start time of $t_s$.

The motion of a joint $j_i$, when a posture of a robot shifts from i-th frame to i+1-st frame, can be expressed as follows:

$$J_i = \sum_{i=0}^{n} c_i y_i, \quad (2)$$

$$y_i = k_i(t - t_i)\delta_i \leq 1, \quad (3)$$

where $c_i$ is an angle, $k_i$ is an angular velocity, and $k_i = c_s m_i \geq 0$. $m_i$ is a parameter that determines the velocity of a joint motion from time point $t_i$ to time point $t_{i+1}$. The value of $m_i$ is determined by trial and error. Moreover, $\delta_i$ is 1 when $t \geq t_i$, while in turn, $\delta_i$ is null when t does not satisfy $t \geq t_i$.

Walking speed of the robot 110 can be relatively high and may reach 24 cm/sec. Because of such a high walking speed, vibrations are generated while the robot 110 walks. Such vibrations can make the robot 110 unstable. One approach to minimize the vibrations is to provide feedback control based on the angular velocity measured by the gyro sensor 111.

Another feedback control is provided to keep the body 20 upright to a floor surface using a reaction force measured with the force sensors $115_1$ to $115_m$. Thus, a roughly set walking pattern of the robot 110 as shown in FIG. 1 is corrected to achieve smooth and stable walk.

Figure 10:
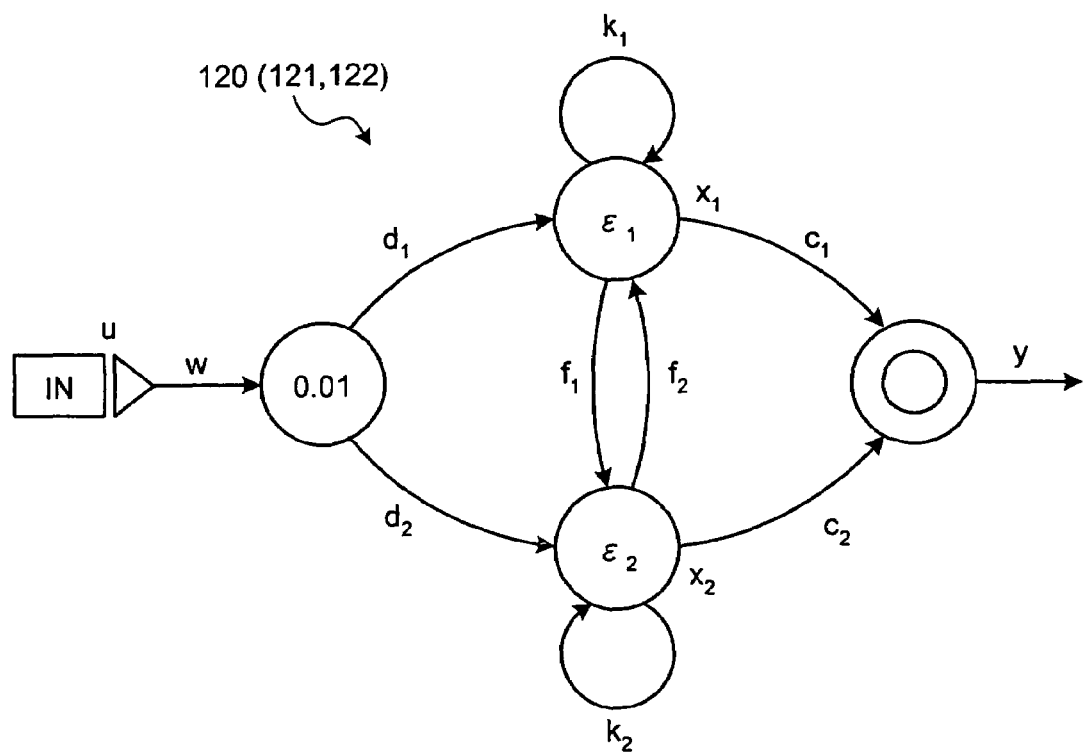
FIG. 10 is a schematic of a controller that receives an input from a gyro sensor or force sensors shown in FIG. 3.

FIG. 10 is a schematic of a controller that receives an input from the gyro sensor 111 or the force sensors $115_1$ to $115_m$. The controller 120 is a quadratic one, and the state space representation thereof is generally expressed as follows:

$$\frac{dx}{dt} = Ax + Bu, \quad (4)$$

$$y = Cx, \quad (5)$$

where x is a state vector, u is an input vector, y is an output vector, A is a system matrix, B is an input matrix, and C is an output matrix. The quadratic controller is only an example; a controller of other orders can be used. The controllers 121 and 122 described later have the same configuration as the controller 120.

The equation (4) can be expressed as follows:

$$\frac{dx_i}{dt} = \sum_{j=1}^{n} a_{ij} x_j + b_i u \quad (6)$$

Further, this equation can be rewritten as follows:

$$\frac{\delta_i}{a_{ii}} \frac{dx_i}{dt} + x_i = (1 + \delta_i) x_i + \sum_{j=1, j \neq i}^{n} \frac{\delta_i a_{ij}}{a_{ii}} x_j + \frac{\delta_i b_i}{a_{ii}} u \quad (7)$$

where $\delta_i = \text{sign}(a_{ii})$. The left side of the equation (7) represents an output from a neuron, while the right side represents an input into a neuron.

FIG. 10 depicts an RNN circuit when n is 2, where $k_i = 1 + \delta_i$, $\epsilon_i = \delta_i/a_{ii}$, $d_i = \delta_i b_i/a_{ii}$, $f_i = \delta_i a_{ij}/a_{ii} (i \neq j)$.

Each of the parameters in the controller 120 is adjusted to an appropriate value through the learning process or trial and error. In that case, the initial value can be determined by, for instance, the Ziegler-Nichols adjustment method which has been generally employed in the art.

More specifically, to obtain an initial value, the robot 110 is controlled to conduct a half-step walking motion (starting from the frame P0 to frame P6 in FIG. 1) where the robot 110 is standing on one leg, after which a critical value of a proportional gain in relation to continuous vibration is calculated. From this critical value and a period of the vibration, a PID (Proportional-Integral-Derivative) control parameter is calculated and the calculated control parameter is set an initial value.

It is also possible to determine an initial value of a control parameter for a controller for stably controlling the robot, in which the recursive least squares method is employed based on information received from the gyro sensor 111 and information on a position of a joint.

Alternatively, it is possible to estimate an initial value of a control parameter for making dynamic characteristics of the robot stable by using the pole placement technique which has been generally employed in the art.

To optimize a control parameter of the controller, a weighting coefficient and a time delay constant of the controller shown in FIG. 10 are adjusted by trial and error to ensure a quick response without vibration. The method of modeling dynamic characteristics of a robot based on the conventional technology may be used, and, in this case, optimization may not be suitably performed if modeling of the dynamic characteristics thereof is not accurately carried out.

Eventually, the control parameter for a given joint can be expressed, from the equation (2) and the equation (5), as follows:

$$J_i = Cx + \sum_{i=0}^{n} c_i y_i \quad (8)$$

Figure 11:
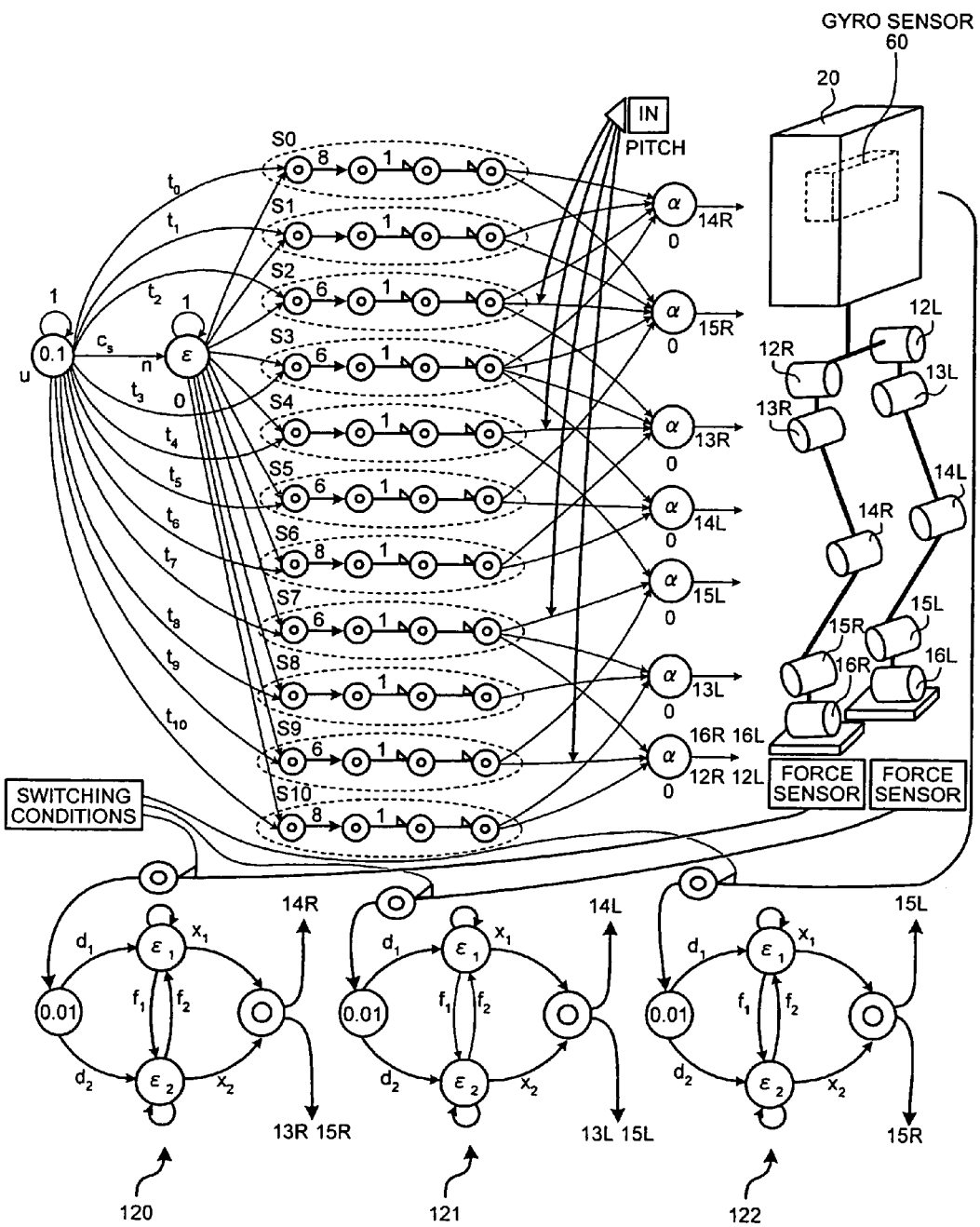
FIG. 11 is a schematic of a neural network for realizing walking of the robot based on a feedback from the gyro sensor and the force sensors.

FIG. 11 is a schematic of a neural network for realizing walking of the robot 110 based on feedback from the gyro sensor 60 (or 111) and the force sensors $115_1$ to $115_m$. The neural network shown in FIG. 11 includes the controllers 120, 121, 122 shown in FIG. 10.

A schematic diagram of the robot 110 shown in FIG. 11 includes the gyro sensor 60 shown in FIG. 3, the joints 12R to 16R, 12L to 16L, and force sensors (the right force sensor and the left force sensor) provided on the soles of the right leg 30R and the left leg 30L.

A stride of the robot can be changed by changing a parameter the pitch shown in FIG. 11. More specifically, the parameter pitch changes a stride of the robot by changing the weighting coefficient of a wire using the cable W.

The controller shown in FIG. 10 receives an input from the various sensors described above. As shown in FIG. 11, for example, the controller 120 receives an input from the force sensors provided on the sole of the right leg 30R, and generates control parameters for each of the right pitch hip joint 13R, the right pitch knee joint 14R, and the right pitch ankle joint 15R. The controller 121 also receives an input from the force sensors provided on the sole of the left leg 30L, and generates control signals for each of the left pitch hip joint 13L, the left pitch knee joint 14L, and the left pitch ankle joint 15L. The controller 122 also receives an input from the gyro sensor 60, and generates control parameters for each of the right pitch ankle joint 15R and the left pitch ankle joint 15L.

More specifically, the control parameters are generated so that a performance function for estimating an inclination of the body 20 of the robot 110 and a balance of the barycenter of the robot 110 based on information concerning the rolling angle of the body 20 detected by the gyro sensor 111 and the reaction forces detected by the force sensors $115_1$ to $115_m$.

An algorithm for generating those control parameters firstly stabilizes an operation of the robot 110 from a first frame to a second frame. The algorithm then stabilizes an operation of the robot 110 from the first frame to a third frame by adjusting a control parameter in the second frame.

Next, the algorithm gives consideration to a fourth frame, and adjusts a control parameter in the third frame so that operations of the robot 110 from the first frame to the fourth frame are stabilized. The algorithm repeats the processing as described above, and eventually adjusts a control parameter of a frame just before a reference frame so that operations of the robot 110 from the first frame to the reference frame are stabilized.

Namely, this algorithm stabilizes operations of the robot 110 by adjusting little by little a control parameter in a frame preceding the frame of interest.

FIG. 12 is a schematic of a process procedure for adjusting a control parameter using a performance function. FIG. 12 illustrates a case of adjusting a control parameter in the frame P0 and frame P1 shown in FIG. 1.

The frame P0 corresponds to a stand-up posture of the robot 110 before the start of walking. In frame P0, reaction forces $F_1$ to $F_4$ measured with each of the force sensors 50a to 50d symmetrically provided on the soles of both legs of the robot recursively adjust a control parameter for pitching of the pitch lumbar joint 10 until the following expression is satisfied:

$$\delta_y = (F_3+F_4)/\Sigma F_i - 0.5 \cong 0.21$$

This equality represents a condition in which the robot 110 can stably stand up having a posture of the frame P0.

The frame P1 corresponds to a posture in which the robot 110 stands only on the right leg with a stride of zero. In the frame P1, reaction forces $F_1$ to $F_4$ measured with each of the force sensors 50a to 50d symmetrically provided on the sole of the right leg of the robot recursively adjust a control parameter for rolling of the right roll hip joint 12R and the right roll ankle joint 16R, namely, $c_i$ in the equation (2) until the following equality is satisfied:

$$\delta_x = (F_2+F_3)/\Sigma F_i - 0.5 \cong 0.40$$

This equality represents a condition in which the robot 110 can stably stand up having a posture in the frame P1.

In the frame P1, a rotational angle in the rolling direction of the body 20 of the robot 110 measured with the gyro sensor 60 recursively adjusts a control parameter for rolling of the right roll hip joint 12R so that the performance function as follows is minimized:

$$\int_{t_1}^{t_2} (Jyro_y - Jyro_h)^2 dt \qquad (9)$$

where $Jyro_y$ is the actual rolling angle, $Jyro_h$ is a rolling angle when the robot 110 stands upright, and each of $t_1$ and $t_2$ is a prespecified time. This expression is used for compensating the gear backlash.

When shifting from the frame P0 to frame P1, movements of the robot 110 are controlled by adjusting the angular velocity of the basic operation illustrated in FIG. 9, namely, the angular velocity $k_t$ in the equation (3) and by further adjusting a vibrational amplitude of rolling based on the measured result of a rolling angle with the gyro sensor 60.

The control parameter in other frames can be adjusted in the same manner as the frames P0 and P1, though a set value or a performance function of $\delta_y$ and $\delta_x$ shall be different.

Particularly, the basic RNN circuit for realizing a posture in the reference frames P6 and P11, namely, the angular velocity $k_t$ for the basic RNN circuit corresponding to the frames P5 and P10 is adjusted by trial and error, using the gyro sensor 60 to estimate a pitching angle of the robot 110.

Figure 13:
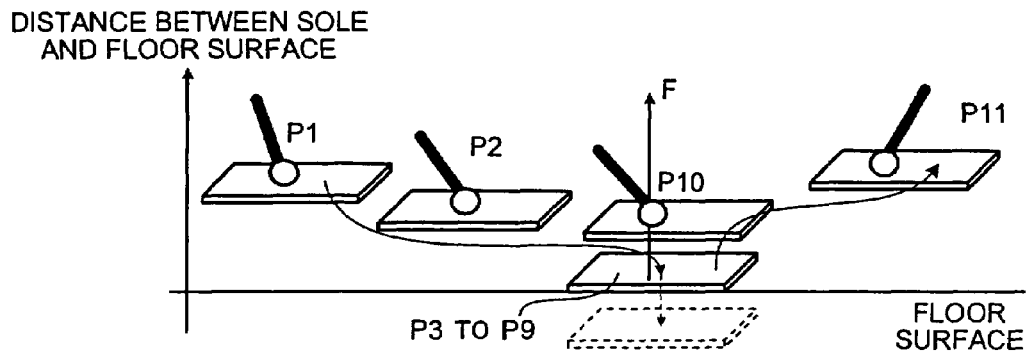
FIG. 13 is a schematic for explaining landing of a leg of the robot.
Figure 14:
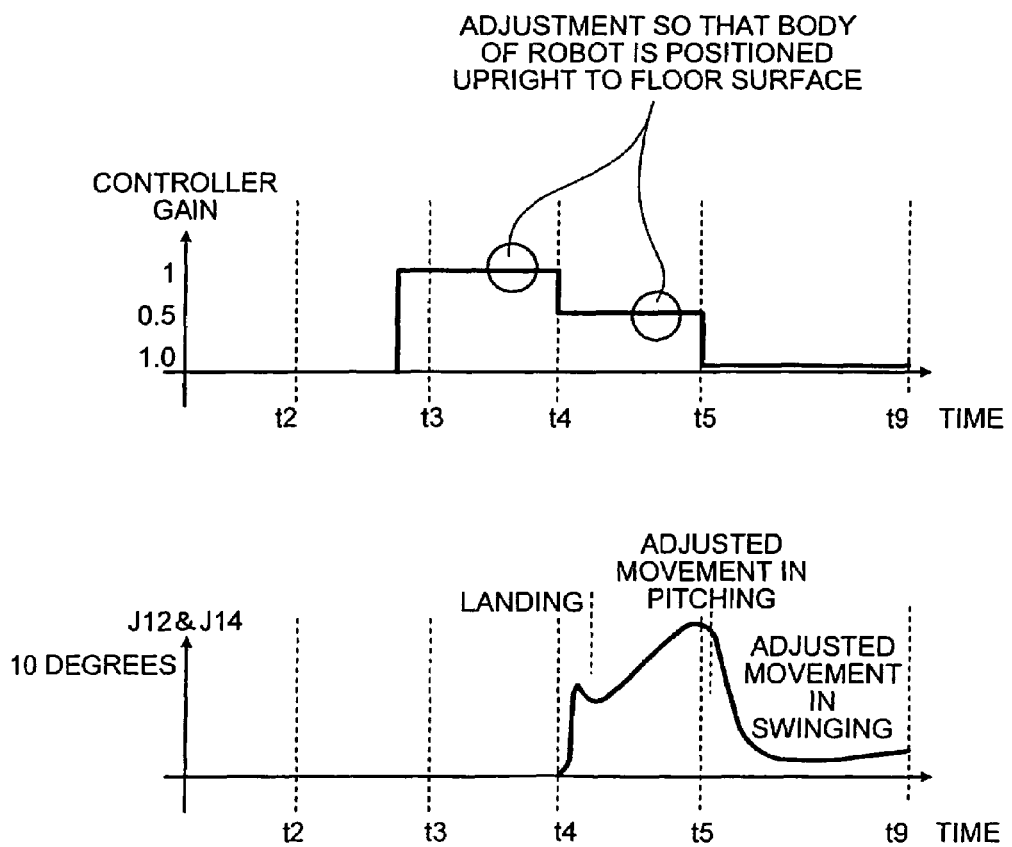
FIG. 14 is a schematic for explaining adjustment of a controller gain.

The weighting coefficient w of a wire in which the controllers 120, 121 receive an input from the force sensors, or a controller gain changes while the robot 110 is walking. FIG. 13 is a schematic for explaining landing of a leg of the robot 110. FIG. 14 is a schematic for explaining adjustment of a controller gain.

The landing starts at the time point t3 shown in FIG. 4, and the left leg that has landed on the floor surface keeps on making a physical contact with the floor surface between the point times t4 and t10. Namely, as shown in FIG. 13, the left leg lands on the floor surface from the frame P3 to the frame P9 shown in FIG. 1.

As shown in FIG. 14, the controller gain is set in such a manner that it becomes maximum before the landing phase is started (before the time point t3). Namely, the weighting coefficient w is set as the maximum value $w_{max}$ to allow a soft landing of the leg, thereby mitigating a shock upon landing.

Immediately after the landing of the left leg (at the time point t4), the controller gain is reduced by half, so that the left leg can securely catch the floor surface. Namely, the weighting coefficient w is set to be down by half of the maximum value $w_{max}$.

Moreover, in a swing phase in which the right leg is thrown forward, the controller gain is set in such a manner that it becomes minimum so that the left leg can catch the floor surface further securely. Namely, the weighting coefficient w is set as the minimum value $w_{min}$.

For instance, the value of $w_{max}$ and that of $w_{min}$ are determined by trial and error so that the body 20 of the robot 110 is positioned upright to the floor surface. These values may be determined using other recursive methods.

In this manner, a roughly set walking pattern of the robot is modified to achieve smooth and stable motion of the robot. In other words, the robot 110 can be controlled so as to walk stably only by adjusting the controller gain. Thus, there is no need to acquire information about the floor surface. Therefore, it does not matter whether the floor surface is flat or inclined, or even having steps.

The angle of rotating each joint is shown in FIG. 4 when the robot 110 performs a walking motion, and, to maintain continuity of each velocity of each joint, an output to each joint is made to pass through a neuron having the time delay constant of α shown in FIG. 11. This neuron functions as a linear low pass filter.

FIG. 15 is a schematic for explaining an action of a neuron having a prespecified time delay constant. The time delay constant corresponds to a time constant indicating an extent of a response delay to a step input. As a result, a rapid change in the angular velocity of each joint can be prevented, and continuity of the angular velocity can be secured by outputting a control parameter to each joint via a neuron having the time delay constant α.

A case has been explained above in which the neuron constitutes a first-order low pass filter; however, the number of orders of the low pass filter is optional. Furthermore, a case has been explained above in which the time delay constant of each neuron is the same value of α; however, the constant of each neuron may be different from each other. Moreover, the time delay constant of α can be obtained by trial and error.

FIG. 16 includes photographs of the robot 110 stably walking on a floor surface. As shown in FIG. 16, in the robot control described above, the robot 110 can be controlled so that, the robot 110 not only can stably walk on a flat floor surface but also can stably walk on a inclined floor surface or steps even when an inclination or a height of the floor surface is not known in advance.

As described above, the central control section 119 controls motions of the robot 110 by acquiring information on a plurality of frames P0 to P11 including a plurality of reference frames P1, P6 and P11, and by computing control information for the robot 110 during a plurality of the time points corresponding to each of the frames. As a result, it becomes possible to effectively control the robot 110 so that the robot 110 can stably perform various motions without the need for modeling the robot 110 itself or an environment of the robot 110.

Furthermore, the posture for the robot 110 of suspending a travel thereof without falling down is designed to be a posture in which the robot 110 stands on only one leg and the stride of the robot 110 is zero, so that the central control section 119 can provide controls to change the motion of the robot 110.

Furthermore, the central control section 119 is configured to provide controls so that the robot 110 stably operates while correcting a roughly set posture by acquiring information concerning the operating state of the robot 110 such as an inclination of the body 20 and a reaction force received by the soles of the legs from a floor surface through the gyro sensor 111 and the force sensors $115_1$ to $115_m$ and by correcting information concerning the frames at a plurality of time points based on the acquired information concerning the operating state.

Furthermore, the central control section 119 is configured to change a gain of information of interest according to the state of the leg of the robot 110 when information concerning a reaction force received by the legs from a floor surface is acquired from the force sensors $115_1$ to $115_m$, and controls over operations of the robot 110 are provided based on the acquired information, so that the central control section 119 can suitably control flexibility when a leg of the robot 110 lands on a floor surface according to the state of the leg.

Furthermore, the central control section 119 is configured to make, when a leg of the robot lands on a floor surface, the gain smaller than that before landing of the leg, so that the central control section 119 can provide controls to softly land the leg on the floor surface and securely catch the floor surface.

Furthermore, the central control section 119 is configured to make, when one leg of the two-legged robot 110 lands on a floor surface and the other leg is thrown forward of the robot 110, the gain smaller than a gain before the other leg is thrown forward, so that the central control section 119 can provide controls for one leg of the robot 110 to catch the floor surface and for the other leg to be stably thrown forward.

Furthermore, the central control section 119 is configured to provide controls so that a request of changing an operation of the robot 110 is received from the external terminal device 100, and the operation of the robot 110 is changed based on the received request, thereby facilitating a change of an operation of the robot 110.

One embodiment of the present invention has been described above, however, the present invention is not limited to the embodiment but can be implemented in various other ways within the range of the technological idea described in the claims.

Among each of the processings described in this embodiment, all or some processings described to be automatically performed can be manually performed, while in turn, all or some processings described to be manually performed can be automatically performed utilizing available methods.

Moreover, the procedure of processing, the procedure of control, specific names, and information including various types of data and parameters provided in the documents and drawings described above can be discretionarily changed unless otherwise noted.

Each component of each device shown in each figure represents a functional concept, and is not necessarily constituted as shown in the figure in terms of a physical meaning. Namely, a specific conformation in distributing and integrating the robot controller is not limited to that shown in the figure, and the robot controller can be constituted by functionally and physically distributing and integrating all or some of the components in a given unit according to various types of loading or the state of use.

All or any part of each processing function performed by the robot controller can be realized by a CPU or by a program which is analyzed and executed the CPU, or can be realized as hardware by means of a wired logic.

The method of controlling a robot described in this embodiment can be realized by executing a computer program on a computer.

The computer can receive the computer program via a network such as the Internet. Alternatively, the computer can read the computer program from a computer-readable recording medium. The computer-readable recording medium can be a hard disk, a flexible disk (FD), a CD-ROM, an MO, and a DVD.

With the present invention, motions of a robot are controlled by acquiring information relating to postures of a robot including suspension of movement without falling at a plurality of time points previously set and computing control information for the robot between the plurality of time points corresponding to postures of the robot so that the robot suspends a travel thereof based on the acquired information concerning postures at the plurality of time points, whereby there is provided the advantage that efficient control is possible for enabling the robot to perform various motions without the need for modeling the robot itself and a peripheral environment for the robot.

Further, in the present invention, a posture of a robot for suspending a travel without falling is defined as that in which a robot having two legs stands on only one leg and a stride of the robot is zero, whereby there is provided the advantage that controls can be provided for enabling the robot to shift to a movement different from that having been done so far in the stable state.

With the present invention, information relating to movement of a robot is acquired, and information relating to postures of the robot at a plurality of time points is corrected based on the acquired information relating to motions of the robot, whereby there is provided the advantage that controls can be provided for enabling the robot to operate in the stable state corresponding to postures of the robot roughly set.

With the present invention, when information relating to a reaction force which a robot receives through legs thereof from a floor surface is received and motions of the robot is controlled based on the acquired information, a gain of the information is changed according to a state of the legs of the robot, whereby there is provided the advantage that the flexibility in landing of robot legs onto a floor surface can be correctly controlled according to the state of legs of the robot.

With the present invention, when a leg of a robot lands on a floor surface, the gain is made smaller than that before the leg lands on the surface floor, whereby there is provided the advantage that controls can be provided for enabling the robot legs to softly land on a floor surface and then the legs accurately and stably sense and stand on the floor surface.

With the present invention, when one of two legs of a robot lands on a floor surface and other one is stridden forward, the gain is made smaller than that before the other leg is stridden forward, whereby there is provided the advantage that controls can be provided for enabling stable stride of the other leg.

With the present invention, a request for changing movement of a robot is accepted and controls for changing motions of the robot are provided based on the accepted request, whereby there is provided the advantage that motions of the robot can be easily changed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A robot controller that controls motions of a robot, comprising:
    a posture information acquiring unit that acquires posture information indicative of a posture of the robot at each of a plurality of different time points, the postures being generated before the robot starts walking and including at least one reference posture in which the robot stands alone without falling down; and
    a motion controlling unit that controls motions of the robot in between any two of the postures by using a recurrent neural network (RNN) circuit, wherein
    control information is calculated based on the posture information of at least the two postures such that the motion of the robot reaches the reference posture.

2. The robot controller according to claim 1, wherein the robot is a two-legged robot, and the reference posture is a posture in which the robot stands alone only on one leg and a stride is zero.

3. The robot controller according to claim 1, further comprising:
    a motion state information acquiring unit that acquires motion information indicative of a state of motions of the robot; and
    a correcting unit that corrects the posture information acquired by the posture information acquiring unit based on the motion information acquired by the motion state information acquiring unit, wherein
    the motion controlling unit calculates the control information based on corrected posture information.

4. The robot controller according to claim 1, wherein the robot is a two-legged robot, and the robot controller further comprising:
    a reaction force information acquiring unit that acquires force information indicative of a reaction force received by a sole of each of the legs of the robot from a floor surface on which the robot walks; and
    a gain adjusting unit that adjust a gain of the force information based on a state of the leg of the robot, wherein
    the motion controlling unit calculates the control information based on the gain adjusted by the gain adjusting unit.

5. The robot controller according to claim 1, further comprising a request receiving unit that receives a request for changing motion of the robot, wherein
    the motion controlling unit provides a control to change motion of the robot based on the request received by the request receiving unit.

6. The robot controller according to claim 1, wherein the recurrent neural network (RNN) circuit controls the motions of the robot using a piecewise linear function modulated by a decaying exponential.

7. The robot controller according to claim 6, wherein the recurrent neural network (RNN) circuit controls the motions of the robot using a combination of basic recurrent neural network circuits generating the piecewise linear function, and signal output from the combination of the basic recurrent neural network circuits is smoothed by the decaying exponential that functions as a low-pass filter before the signal is sent to a motor for controlling movements of a joint.

8. The robot controller according to claim 1, wherein the recurrent neural network (RNN) circuit controls the motions of the robot using a combination of basic recurrent neural network circuits generating piecewise linear functions, and signal output from the combination of the basic recurrent neural network circuits is smoothed by a low-pass filter before the signal is sent to a motor for controlling movements of a joint.

9. A robot controller that controls motions of a two-legged robot, comprising:
    a posture information acquiring unit that acquires posture information indicative of a posture of the robot at each of a plurality of different time points, the postures including at least one reference posture in which the robot stands alone without falling down;
    a motion controlling unit that controls motions of the robot in between any two of the postures by calculating control information based on the posture information of at least the two postures such that the motion of the robot reaches the reference posture;
    a reaction force information acquiring unit that acquires force information indicative of a reaction force received by a sole of each of the legs of the robot from a floor surface on which the robot walks; and
    a gain adjusting unit that adjusts a gain of the force information based on a state of the leg of the robot, wherein
    the motion controlling unit calculates the control information based on the gain adjusted by the gain adjusting unit, and the gain adjusting unit sets, when the leg of the robot lands on the floor surface, a gain of the force information smaller than a gain before the leg of the robot lands on the floor surface.

10. A robot controller that controls motions of a two-legged robot, comprising:
    a posture information acquiring unit that acquires posture information indicative of a posture of the robot at each of a plurality of different time points, the postures including at least one reference posture in which the robot stands alone without falling down;
    a motion controlling unit that controls motions of the robot in between any two of the postures by calculating control information based on the posture information of at least the two postures such that the motion of the robot reaches the reference posture;
    a reaction force information acquiring unit that acquires force information indicative of a reaction force received by a sole of each of the legs of the robot from a floor surface on which the robot walks; and
    a gain adjusting unit that adjusts a gain of the force information based on a state of the leg of the robot, wherein
    the motion controlling unit calculates information based on the gain adjusted by the gain adjusting unit, and the gain adjusting unit sets, when one leg of the robot lands on the floor surface and other leg is thrown forward of the robot, a gain of the force information smaller than a gain before the other leg is thrown forward.

11. A method of controlling motions of a robot, comprising:
- a posture information acquiring step of acquiring posture information indicative of a posture of the robot at each of a plurality of different time points, the postures being generated before the robot starts walking and including at least one reference posture in which the robot stands alone without falling down; and
- a motion controlling step of controlling motions of the robot in between any two of the postures by using a recurrent neural network (RNN) circuit, wherein
- control information is calculated based on the posture information of at least the two postures such that the motion of the robot reaches the reference posture.

12. A robot controller that controls motions of a robot, comprising:

- a posture information acquiring unit that acquires posture information indicative of a posture of the robot at each of a plurality of different time points, the postures being previously generated and including at least one reference posture in which the robot stands alone without falling down; and
- a motion controlling unit that controls motions of the robot in between any two of the postures by using a recurrent neural network (RNN) circuit, wherein
- control information is calculated based on the posture information of at least the two postures such that the motion of the robot reaches the reference posture,
- the recurrent neural network (RNN) circuit controls the motions of the robot using a combination of basic recurrent neural network circuits generating piecewise linear functions, and signal output from the combination of the basic recurrent neural network (RNN) circuits is smoothed by a low-pass filter before the signal is sent to a motor for controlling movements of a joint.

* * * * *